United States Patent
Bosma et al.

(12) 
(10) Patent No.: US 6,196,316 B1
(45) Date of Patent: Mar. 6, 2001

(54) COMPOSITIONS FOR USE IN WELL CONSTRUCTION, REPAIR AND/OR ABANDONMENT

(75) Inventors: Martin Gerard Rene Bosma; Erik Kerst Cornelissen, both of GD Rijswijk (NL); Paul William Edwards, Bath (GB); Petronella Theodora Maria Reijrink, GD Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/258,856

(22) Filed: Feb. 26, 1999

(30) Foreign Application Priority Data

Feb. 26, 1998 (NL) .................................................. 98301423

(51) Int. Cl.$^7$ .................................................... E21B 33/13
(52) U.S. Cl. ............................................ 166/294; 166/292
(58) Field of Search .................................. 166/285, 292, 166/294, 286, 279, 280; 507/926

(56) References Cited

U.S. PATENT DOCUMENTS

| | | |
|---|---|---|
| 3,560,427 | 2/1971 | Bezemer et al. . |
| 3,616,858 | 11/1971 | Raza . |
| 3,670,091 | 6/1972 | Frantz et al. ........................ 174/52.2 |
| 4,331,722 * | 5/1982 | Packo et al. ............................ 138/97 |
| 4,580,794 | 4/1986 | Gibbons ................................ 277/650 |
| 4,642,356 | 2/1987 | Langner et al. . |
| 4,862,967 * | 9/1989 | Harris ................................... 166/378 |
| 4,946,737 | 8/1990 | Lindeman et al. ..................... 442/417 |
| 5,159,980 * | 11/1992 | Onan et al. ........................... 166/294 |
| 5,293,938 | 3/1994 | Onan et al. ........................... 166/293 |
| 5,484,020 | 1/1996 | Cowan ................................. 166/295 |
| 5,571,318 * | 11/1996 | Griffith et al. ........................ 106/725 |
| 5,595,826 | 1/1997 | Gray et al. . |
| 5,656,710 * | 8/1997 | Newberth et al. ....................... 528/14 |
| 5,712,314 * | 1/1998 | Surles et al. ............................ 521/41 |
| 5,795,924 * | 8/1998 | Chatterji et al. ...................... 523/130 |
| 5,836,390 * | 11/1998 | Apps et al. ........................... 166/281 |

FOREIGN PATENT DOCUMENTS

| | | |
|---|---|---|
| 776936 | 4/1997 | (EP) . |
| 0 325 541 A1 | 1/1989 | (FR) ........................... E21B/33/134 |

OTHER PUBLICATIONS

R. D. Duff et al., Viscoelastic Slabstock Foam Fundamentals, Properties and Applications, paper presented at *35$^{th}$ Annual Polyurethane Technical/Marketing Conference*, Oct. 9–12, 1994, 661–664.

W.V.C. de Landro and D. Attong, "Case History: Water Shut–off using Plastic Resin in a High Rate Gravel pack Well" —Paper SPE 36125 presented at the 4$^{th}$ Latin American and Caribbean Petroleum Engineering Conference, held at Port of Spain in Trinidad, Apr. 23–26, 1996.

R. Ng and C.H. Phelps, "Phenolic/Epoxy Resins for water/Gas Profile Modification and Casing Leak Repair" —Paper ADSPE #90, presented at the ADIPEC, held in Abu Dhabi (16–19) Oct. 1994).

P.A. Parceveaux and P.H. Sault, paper, SPE 13176, presented at the 59$^{th}$ Annual Technical Conference and Exhibition in Houston, Texas (Sep. 16–19, 1984) entitled "Cement Shrinkage and Elasticity: A New Approach for a Good Zonal Isolation".

G.M. Bol, M.G.R. Bosma, P.M.T. Reijrink and J.P.M. van Vliet: "Cementing: How to achieve Zonal Isolation" as paper presented at the 79 OMC (1997 Offshore Mediterranean Conference), held in Ravenna, Italy (Mar. 19–23, 1997).

R. Ng and C.H. Phelps, Phenolic/Epoxy Resins for Water/Gas Profile Modification and Casing Leak Repair, ADSPE #90, paper presented at the 6$^{th}$ Abu Dhabi International Petroleum Exhibition and Conference, Oct. 19, 1994, 219–232.

Search Report dated Dec. 08, 1999.

* cited by examiner

*Primary Examiner*—David Bagnell
*Assistant Examiner*—Jennifer Dougherty

(57) ABSTRACT

Method for carrying out well construction, repair and/or abandonment operations using an addition-curing silicone formulation, in particular for forming a permanent plug in a well bore or in one or more subterranean formations penetrated by the well bore by placing a mixture of cement and an addition-curing silicone formulation in the one or more subterranean formations or in the well bore at a desired location therein or placing an addition-curing silicone formulation on top of an existing non-gas tight plug and allowing the silicone formulation to set thereby producing a gas tight plug.

24 Claims, No Drawings

COMPOSITIONS FOR USE IN WELL CONSTRUCTION, REPAIR AND/OR ABANDONMENT

The present invention relates in general to oil and gas well completion and remedial methods.

The main objectives for drilling a well are to create a connection to the oil and/or gas reservoir and to install tubing between the reservoir and the surface. The outer steel protection is called the casing. The casing requires a gas tight seal between the reservoir and the surface. To achieve such seal, the annulus (the gap between the casing and the rock/formation) is subjected to a cementing (or grouting) operation. This treatment is normally referred to as Primary Cementing. The main aspects of primary cementing are to isolate flow between different reservoirs, to withstand the external and internal pressures acting upon the well by offering structural reinforcement and to prevent corrosion of the steel casing by chemically aggressive reservoir fluids.

A poor cementing job can result in migration of reservoir fluids, even leading to gas migration through micro-annuli in the well which not only reduces the cost-effectiveness of the well but may cause a "blow out" resulting in considerable damage. Although repair jobs ("secondary cementing") are possible (in essence forcing more cement into the cracks and micro-annuli) they are costly and do not always lead to the desired results.

When a well has reached the end of its economically productive life, the well needs to be abandoned in compliance with local regulations. Abandonment is usually carried out by first plugging each of the casings in a large number of sequential steps, cutting and removing the steel casings and placing a large cement plug to seal the well. As only a relatively small volume of cement (typically in the order of 100 m) is used to place the plug, its quality needs to be sufficient as it will serve as a seal for a very long time.

The customary abandonment operation is very costly, especially in an off-shore environment, since it requires the use of a workover or drilling rig. It would be very beneficial if methods were available which could lead to abandonment of wells without the necessity to remove the production tubing.

One of the major drawbacks of using traditional cementing materials such as Class G Cement (e.g. OPC: Ordinary Portland Cement) in plugging is that such materials cannot achieve a gas tight seal due to the inherent shrinkage of the materials. Shrinkage is typically in the order of 4–6% by volume which causes gas migration through the micro-annuli created because of the shrinkage. The use of such cementing material in "remedial secondary cementing" has the disadvantage that the customary grain size is too large to pass freely into the micro-annuli which affects the quality of the seal.

In the search for effective cementing materials, attention has to be paid to inter alia the following requirements: the material should be gas-tight (i.e. withstand at least 2 bar per m), it should have a controllable setting time so that a range of temperatures and well depths (each requiring different conditions) can be coped with, it should be thermally stable up to 250° C. as well as being chemically stable against reservoir fluids for a very long period of time and its Theological properties should be such that pumping through existing oil field equipment can be carried out without too much problems.

A wide range of non cementious plugging agents has been suggested to cope with at least part of the problems outlined hereinabove. Examples of such materials are Epoxy Resins (R. Ng and C. H. Phelps: "Phenolic/Epoxy Resins for water/Gas Profile Modification and Casing Leak Repair"—Paper ADSPE #90, presented at the ADIPEC, held in Abu Dhabi (16–19) October 1994), Phenol-or Melamine Formaldehyde (W. V. C. de Landro and D. Attong: "Case History: Water Shut-off using Plastic Resin in a High Rate Gravel pack Well"—Paper SPE 36125 presented at the $4^{th}$ Latin American and Caribbean Petroleum Engineering Conference, held at Port of Spain in Trinidad, Apr. 23–26, 1996) and Poly-acrylates (U.S. Pat. No. 5,484,020 assigned to Shell Oil).

Although such materials can be instrumental in solving some of the problems encountered with traditional, cement-based plugs, there are still important drawbacks to be reckoned with in terms of handling aspects, control of setting times and long term durability.

Also rubbers have been proposed in general for use as plugging materials. Reference is made to U.S. Pat. No. 5,293,938 (assigned to Halliburton Company) directed to the use of compositions consisting essentially of a mixture of a slurry of a hydraulic cement (such as Portland cement) and a vulcanisable rubber latex. Rubbers specifically referred to in said US patent specification are natural rubbers, cis-polyisoprene rubber, nitrile-rubber, ethylene-propylene rubber, styrene butadiene rubber, butyl rubber and neoprene rubber. The use of silicone rubber is also stated as a possibility but such rubber generally has less desirable physical properties, requiring incorporation of inorganic extenders.

The vulcanisation of the rubber involves the cross-linking of the polymer chains which can be accomplished by incorporating one or more crosslinking agents (the most common one being sulphur) in the rubber latex (latex having been defined as the aqueous dispersion or emulsion of the rubber concerned).

In European patent specification 325,541 (Merip Tools International S.A) the use of putty ("mastic") has been disclosed for producing joints separating zones in wells. Suitable compounds are formed by liquid elastomers such as fluorosilicones, polysulphides, polythioethers as well as epoxy or phenolic resins.

It has now been found that a specific class of RTV (Room Temperature Vulcanising) silicone components can be advantageously employed in the repair and abandonment of wells. In case of well abandoning they can be used either in the form of a mixture with an appropriate cement compound when setting a plug or as a sealing body on top of an existing cement-based plug.

Silicone rubbers which exert sealant activity can be differentiated on the basis of their method of production. Also their properties are dependent to a certain extent on the chemical composition envisaged.

A first class of silicone sealant can be described as having been prepared by a condensation type of curing process, using a condensation catalyst, as described in (1):

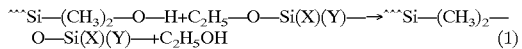
(1)

in which X and Y are inert groups and ˜˜˜ represents the polymer backbone of the silanol-terminated polymer.

A second, related class of silicone sealants can be described as having been produced by the termination of a silanol functional polymer by a reactive cross-linking agent. This is also a condensation reaction using a condensation catalyst, as described in (2):

$$(A)(B)-R+H-Z \tag{2}$$

in which each of Z, A and B is a group capable of reacting with the —O—H moiety of the silanol terminated polymer, R represents the backbone of the reactive cross-linking agent and ^^^ represents the polymer backbone of the silanol-terminated polymer. It is also possible to subject the silicone produced according to reaction (2) to a further hydrolysis step in which the composition identified as ^^^Si(CH$_3$)$_2$—O—Si—(A)(B)—R reacts with H$_2$O to give a cross-linked silicon elastomer and by-products H—A and/or H—B. This process is known as moisture-catalysed vulcanisation.

A third class of silicone sealants can be described as having been prepared by an addition-curing process, using a platinum catalyst under conditions of elevated temperature, as described in (3):

$$\tag{3}$$

in which K and L are inert groups and ^^^ represents the backbone of the vinyl functional silicone polymer.

It has surprisingly been found that well repair and abandonment operations can be carried out advantageously and with a better level of control when silicone sealants are involved which are based on the "addition-curing" principle rather than on the "condensation" principle. Without wishing to be bound on any particular theory it is believed that the by-products obtained when producing silicone sealants in situ via the condensation-type of curing affect the efficiency of such materials when coming into contact with (cementious) parts present in the well. Moreover, there are structural differences which may have an impact on the properties.

The present invention therefore relates in general to the use of addition-curing silicone formulations in well construction, repair and abandonment operations.

The present invention relates in particular to a method for forming a temporary or permanent plug in a well bore or in one or more subterranean formations penetrated by the well bore which comprises either placing a mixture of a cement and an addition-curing silicone formulation in said one or more subterranean formations or in said well bore at a desired location therein or placing an addition-curing silicone formulation on top of an existing non-gas tight plug and allowing the silicone formulation to set thereby producing a gas tight plug.

The remarkable results in accordance with the present invention can be obtained when using a two component Room Temperature Vulcanising (RTV) silicone rubber or fluor-containing RTV silicone rubber. Such two component systems comprise two base chemicals: a hydride functional silicone cross linking agent and a vinyl functional silicone polymer. When these base compounds are brought into contact they will react, presumably via the addition-curing principle as discussed hereinabove, thereby producing a silicone rubber or gel type material. One of the advantages of this curing system is that it does not require an external reagent to initiate reaction (like water, e.g. present in moist air). A further advantage of this curing system is that it does not produce unwanted or damaging by products like alcohols or acetic acid. It is also not limited by diffusion of one of the reactants (i.e. the moist air) into the other very viscous component. Therefore, the reaction of the two components will proceed independently of their respective volumes.

In principle, every two component RTV system based on the curing reaction between the individual components can be utilised for a variety of well construction, repair and abandonment applications. Such systems are stable up to very high temperatures, e.g. at temperatures up to 250° C., or even up to 300° C. and are chemically inert. Moreover, the setting behaviour of this particular type of RTV silicone rubbers and gels can be retarded or accelerated. Their Theological characteristics are suitable for coiled tubing applications. It was also found that so-called sandwich plugs (RTV silicone gels backed up by a cement column) were able to withstand high differential pressures (e.g. pressures up to 80 bar/m and possibly higher) whilst maintaining their property of being gas tight.

The silicone formulations based on the "addition-curing" principle can be used in a variety of applications.

For instance, they can be applied for zone isolation or for replacing a damaged or corroded casing by placing a low viscosity, two component RTV silicone formulation in the well bore so as to bind with the undamaged casing and to close off any thief zone. Upon standing the two component mixture will form a resilient rubber-type material which is capable of withstanding the rather severe chemical and temperature conditions to which it is exposed.

The silicone formulations can also be applied for the curing of annular (gas) pressures in oil and gas wells by sealing the offending annulus by injecting an initially low viscosity two component RTV silicone rubber into the annulus which will result in the formation of a tough visco-elastic silicone gel plug having a high yield stress. Typically, the length of such plug can be between 30 and 50 meter. The treatment can be followed by a flush of a heavy brine solution (e.g. a calcium chloride, calcium bromide, zinc bromide or caesium formate or equivalent solution of a determined density) in order to equilibrate the annular fluid column with the existing reservoir pressure. The combination of the sealing plug (which has its own advantageous flexibility properties) and the high hydrostatic head provided for by the brine solution applied will partly or even totally prevent any further gas influx and the subsequent build-up of annular pressures.

Suitably, the two component system can be applied by injecting it into the well head using an appropriate injection pump. It is preferred to bleed off any annular pressures before starting the injecting operation. It is also possible to pump the two component system against the high annular gas pressure under appropriate safety conditions.

A further advantage of the use of the two component RTV silicone rubber system is that the casings can be retrieved when desired during the future abandonment phase of the well.

The silicone formulations can also be suitably applied in shutting-off watered or gassed-out zones of an oil reservoir by plugging such zones by an impermeable silicone gel system which is initially squeezed into the porous medium as the two component RTV silicone formulation which then reacts to form a chemically and thermally highly impermeable barrier to water or gas flow resulting in a substantially higher oil cut compared with the use of conventional systems such as Cr (III)-cross-linked polyacrylamide gel solutions.

Such silicone formulations are especially important when applied in the so-called "shallow plugging" of discrete watered or gassed-out reservoir sands of an oil well.

Yet another application for which the two component RTV silicone formulations can be used advantageously comprises preventing and/or controlling gas influx into a section of an oil/gas well during primary cementation. It comprises, in essence, using the formulation as a squeeze fluid into the well bore—having landed a casing—and maintaining a predetermined pressure to the squeezed fluid so that the squeezed fluid is forced radially into permeable formations of the well bore wall to create a flushing zone of reduced permeability to gases. Subsequently, a cement slurry is pumped via the so-called "work-string" into the casing formation borehole in a conventional fashion in order to seal the annulus by cement. It is also possible to use a cementitious/silicone formulation mixture to obtain even better results.

The two component RTV silicone formulations can also be used as an intermediate flush in primary cementation. Care should be taken to ensure that the density of the silicone system is between the density of the cementation pre-flush and the density of the cementation after-flush. Such application will result in the silicone system being encapsulated as a chemical packer in the annular void which is filled with the appropriate cement.

It is also possible to apply the two component RTV silicone formulations in the sealing of an expanded tubular against the well bore or against a casing of an existing well to prevent migration of reservoir fluids into neighbouring reservoir sections and/or to the surface. The silicone system thus acts as an alternative for conventional cementation methods in well completion.

It is also possible to use the two component RTV silicone formulations to provide a silicone rubber system which is an alternative to the well-known mechanical packer. Traditionally, a cement plug will be installed in a completion in a through-tubing process so as to recover otherwise uneconomical behind pipe reserves that are above existing production packer installations. The use of the two component RTV silicone formulations, in particular when backed-up by conventional cement for mechanical rigidity, will provide gas tight seals in this application.

It is also possible to inflate well-known External Casing Packers using the two component RTV silicone formulations instead of conventional cement-based systems. The disadvantages connected with the prior art method (cement) of shrinkage during hardening and unpredictable sealing behaviour are overcome by the use of the silicone formulations.

It is also possible to use the two component RTV silicone formulations and polymer/cement compositions in the cementing of multi-lateral wells as well as in circumstances which cause $CO_2$-flooding since the formulations appear to be highly resistant in such environment.

It has been found that certain silicone rubber formulations commercially available from Dow Corning can be advantageously used in the method according to the present invention. Reference is made to Dow Corning products available under the following indications: 3-4225, 3-4230, 3-4231, 3-4232 and 3-4234. It is believed that the above-mentioned products are operative because of addition-curing properties of the individual components (base component and curing agent).

When using the silicone rubber formulations together with a cement composition, it has been found that suitable silicone rubber/cement weight ratios are between 5:1 and 0.5:1, preferably between 3:1 and 1:1. Cement composition well known in the art can be used to provide the system which will form the gas tight compositions according to the present invention. Examples of commercially available cements are Class H and class G Portland cement. Other cements which have comparable properties with the Portland cements mentioned can also be used.

The density of the addition curing silicone formulations according to the invention can be adjusted by addition of heavy weight or lightweight fillers, depending on the required operational regime in the well treatment.

An increased density can be achieved by adding the common heavy weight additives as known in the art e.g. Barite, Hematite, Ilmenite, Manganese Oxide, microfine steel powders and other compounds with a high specific gravity.

It has been proven to be especially useful to add a blend of microfine steel powders and Barite, which will result into a synergistic effect on reduction of settling of the weighting agent/filler before final set of the resin.

Typically a 2:1 blend of 150 Micrometer median particle size steel powder (grade AS-100 obtained from Hogenas AB, Hogenas, Sweden) and Barite (grade C-138 obtained from Schlumberger/Dowell, Coevorden, the Netherlands) was shown to be very effective to create a silicone formulation having a density of 2.2 g/cc (starting from a base formulation with a density of 1.0 g/cc).

The density of the formulation can be decreased by the addition of rigid inert hollow spheres, as known in the art for creating e.g. lightweight cement slurries and drilling fluids.

Examples of such agents are rigid, inert, hollow ceramic (such as spheres sold under the trade name ZEOSPHERES by 3M Corporation) or glass spheres (such as spheres sold under the trade name SCOTCHLITE manufactured by the 3M Corporation), fly ash from coal fired power plants (such as spheres sold under the trade name SPHERELITE by Halliburton Energy Services, Duncan Okla., USA) and the like.

A special application is the use of gas filled expanded, malleable microspheres (such as spheres sold under the trade name DUALITE by Pierce and Stephens or under the trade name EXPANCELL by Akzo Nobel, Sweden) and various microspheres (F-series) manufactured by Matsumoto Yushi-Seyaku Co. Ltd. Japan) in combination with the addition curing silicone formulations according to the invention.

When a silicone formulation with such malleable microspheres is applied in relatively shallow oil/gas well environments (shallower than about 200 m, corresponding with an absolute pressure of some 20–30 bar), a compressible gasket is obtained with extremely good sealing characteristics.

It is observed that U.S. Pat. Nos. 4,580,794, 4,946,737, 3,670,091 describe processes for obtaining compressible silicone formulations which contain malleable microspheres.

The addition curing silicone formulations according to the invention can also be manufactured as hard, sticky resins.

An application of such a system would be as a sand consolidation agent to arrest the production of sand in gas and oil wells, emanating from friable to non consolidated sandstone reservoirs.

The addition curing silicone formulations according to the invention are good replacements for the existing epoxy resins which are limited in the ability to control their reaction kinetics and which have a toxicity level which may become less acceptable for downhole applications.

The temperatures to be applied in the process according to the present invention depend to some extent on the specific application envisaged. They can range between ambient and 180° C. Suitably, temperatures up to 150° C. can be applied conveniently. Good results have been obtained when using temperatures between 40 and 70° C.

The specific formulations can be tested in the large-scale gas migration rig which has been described in detail in the paper by G. M. Bol, M. G. R. Bosma, P. M. T. Reijrink and J. P. M. van Vliet: "Cementing: How to achieve Zonal Isolation" as presented at the 79 OMC (1997 Offshore Mediterranean Conference), held in Ravenna, Italy (Mar. 19–23, 1997) and incorporated herein for reference. The equipment comprises in essence a 4 meter high, 17.8×12.7 cm (7×5 inch) steel annular casing lay-out plus a 50 cm high simulated permeable (3000 mD) reservoir. The equipment can be operated at pressures up to 6 barg and 80° C. The breakthrough of gas in this evaluation of dynamic gas sealing ability during setting of a cement (or another material) is monitored by flow transducers and, in addition, pressure and temperature transducers placed equidistantly across the height of the column. A typical experiment is performed by applying and maintaining a well-defined overbalance between cement column and "reservoir" pressure and monitoring the dependent parameters (flow, pressures and temperatures) versus time.

It is also possible to use a static type of test equipment, e.g. as described in the paper SPE 1376 presented by P. A. Parceveaux and P. H. Sault at the 59$^{th}$ Annual Technical Conference and Exhibition in Houston, Tex. (Sep. 16–19, 1984) entitled "Cement Shrinkage and Elasticity: A New Approach for a Good Zonal Isolation". The test equipment is in essence a high pressure static gas migration apparatus which can be operated up to 200 bar and 150° C. and comprises a cylinder in which appropriate internals such as plugs or annular casing configurations can be simulated. Typically a cement (or other material) is allowed to set inside the cylinder at static conditions (i.e. no delta P). The cement is either present as a mixture with the silicone rubber as defined according to the present invention or has on top of it (seen in the direction of the gas flow) a seal produced by the addition-curing silicone formulation according to the present invention. Subsequently, the possible onset of gas leakage is monitored by applying increasing pressure differentials across the plug or annular casing configuration. To calibrate the test equipment default cement formulations can be used.

The invention will now be illustrated by the following, non limiting Examples.

EXAMPLE 1

Six experiments were carried out in the static test equipment as referred to hereinbefore using a 7 inch (17.78 cm) plug configuration. In Table 1 hereinbelow are given the compositions of each of the systems tested together with the curing conditions applied and the gas sealing performance observed (expressed as: "Failure Pressure"). Composition A denotes Dow Corning 3-4230 and Composition B denotes Dow Corning 3-4225. Ratios as given in the Table denote weight ratios.

TABLE 1

| Sealant | Curing conditions (° C.) | Failure Pressure |
|---|---|---|
| Class G Cement (water/cement ratio 0.44) | 60° C. | 3 bar |
| Composition A | 25° C. | 3 bar |
| Composition A / Class G Cement (ratio 2.5) | 25° C. | 15–20 bar |
| Composition B | 25° C. | 100 mbar |
| Sandwich: Composition A on Class G Cement | 25° C. | 5 bar |
| Sandwich: Composition B on Class G Cement | 25° C. | 150 bar |

The experimental results show the marked improvement in gas tightness obtained by using a mixture of a standard cement and an addition-curing silicone formulation, and in particular when applying such formulations in sandwich type plugs. A field trial using a plug based on a composition A/Class G Cement was carried out successfully (no gas leakage observed after six months operation, test ongoing).

EXAMPLE 2

Four experiments were carried out in the test equipment referred to in Example 1 using a 7×5 inch (17.78 cm×12.70 cm) annular plug configuration. In Table 2 hereinbelow are given the compositions of each of the systems tested together with the curing conditions applied and the gas sealing performance observed (expressed as: "Failure Pressure"). Composition C denotes Dow Corning 3-4232 and Composition B is as described ion Example 1. Ratios given are in % by weight.

TABLE 2

| Sealant | Curing conditions (° C.) | Failure Pressure |
|---|---|---|
| Class G Cement (water/cement ratio 0.44) | 60° C. | 6 bar |
| Sandwich: Composition C/ on Class G Cement | 50° C. | 20 bar |
| Sandwich: Composition B/ on Class G Cement | 50° C. | 55 bar |
| Sandwich: Composition B/ on Class G Cement | 25° C. | 140 bar |

From the experimental results it will be clear that impressive results have been obtained when using Composition B on top of a cementitious annular plug.

EXAMPLE 3

The setting behaviour of Compositions A and B, as referred to hereinbefore and the sandwich compositions containing them were determined in a standard API Cement Consistometer (Nowsco PC-10), operated at low speed (2 rpm) and with a modified spindle (12 mm, no attachments). Reproducible setting rates were found using this set-up. The influence of commercially available retarder compositions was also tested. It was found that setting times can be suitably adjusted which makes such compositions attractive.

As regards Theological characteristics it was found that the two component RTV systems referred to hereinabove exert a power law behaviour when subjected to low shear rates (up to 6 reciprocal seconds) and a Newtonian behaviour when subjected to higher shear rates (over 20 reciprocal seconds) which makes them eminently suitable for coiled tubing application (which is not the case with condensation type sealants).

We claim:

1. Method for carrying out well construction, repair or abandonment operations which comprises using an addition-curing silicone formulation, the method comprising preventing and/or controlling gas influx into a section of an oil/gas well during primary cementation by using a two component room temperature vulcanisable silicone formulation as a squeeze fluid into the well bore, having landed a casing, and applying a predetermined pressure to force the squeeze fluid radially into permeable formations of the well bore wall to create a flushed zone of reduced permeability to gases, followed by a cement-type of annular sealing wherein the cement-type of annular sealing in which the cementitious component also contains a two component room temperature vulcanisable silicone formulation.

2. Method according to claim 1, which comprises isolating a zone or replacing a damaged or corroded casing by placing a two component room temperature vulcanisable silicone formulation in the well bore and allowing it to form a resilient rubber-type material.

3. Method according to claim 1, which comprises shutting-off watered or gassed-out zones of an oil reservoir by plugging such zone by an impermeable silicone gel system which is initially squeezed into the porous zone as the two component room temperature vulcanisable silicone formation which is then allowed to form an impermeable barrier to water or gas flow.

4. Method according to claim 1, which comprises using the two component room temperature vulcanisable silicone formulation to create a silicone rubber packer.

5. Method according to claim 1, which comprises using a two component room temperature vulcanisable silicone formulation to inflate external casing packers.

6. Method according to claim 1, which comprises using additionally a retarder or an accelerator to influence the setting behaviour of the silicone formulation.

7. Method according to claim 1, which comprises forming a plug in a well bore in one or more subterranean formations penetrated by the well bore which comprises placing an addition-curing silicone formulation on top of an existing non-gas tight plug and allowing the silicone formulation to set thereby producing a gas tight plug.

8. Method according to claim 7, which comprises using a room temperature vulcanising silicone rubber.

9. Method according to claim 8, which comprises using a two-component fluor-containing silicone formulation.

10. Method according to claim 7, which comprises using a room temperature vulcanising fluor-containing silicone rubber.

11. Method according to claim 7, which comprises using a silicone formulation and a cement in which the silicone/cement weight ratio is between 5:1 and 0.5:1.

12. Method according to claim 11, which comprises using a silicone formulation and a cement in which the silicone/cement weight ratio is between 3:1 and 1:1.

13. Method according to claim 7, which comprises using a Class G or H Portland cement as the cementitious component in the silicone/cement mixture.

14. Method according to claim 7, which comprises carrying out the production of the gas tight plug at a temperature in the range between ambient and 180° C.

15. Method according to claim 7, which comprises carrying out the production of the gas tight plug at a temperature in the range between ambient and 150° C.

16. Method according to claim 7, which comprises carrying out the production of the gas tight plug at a temperature in the range between 40 and 70° C.

17. Method according to claim 7, which comprises using additionally a retarder or an accelerator to influence the setting behavior of the silicone formulation.

18. Method for carrying out well construction, repair or abandonment operations which comprises using an addition-curing silicone formulation and which further comprises forming a plug in a well bore in one or more subterranean formations penetrated by the well bore which comprises placing a mixture of cement and an addition-curing silicone formulation in the one or more subterranean formations or in the well bore at a desired location therein and allowing the silicone formulation to set thereby producing a gas tight plug wherein the cement and addition-curing silicone formulation is present in the mixture in silicone/cement weight ratio of between 3:1 and 1:1 and wherein the gas tight plut is produced at a temperature in the range of between 40 and 70° C.

19. Method according to claim 18, which comprises using a Class G or H Portland cement as the cementitious component in the silicone/cement mixture.

20. Method according to claim 18, which comprises using a room temperature vulcanising silicone rubber.

21. Method according to claim 20, which comprises using a two-component fluor-containing silicone formulation.

22. Method according to claim 18, which comprises using a room temperature vulcanising fluor-containing silicone rubber.

23. A method for carrying out well construction, repair and/or abandonment operations which comprises using an addition-curing silicone formulation, the method comprising:

preventing and/or controlling gas influx into a section of an oil/gas well during primary cementation by using a two component room temperature vulcanisable silicone formulation as a squeeze fluid into the well bore, having landed a casing;

applying a predetermined pressure to force the squeeze fluid radially into permeable formations of the well bore wall to create a flushed zone of reduced permeability to gases, followed by a cement-type of annular sealing; and using a cement-type of annular sealing in which the cementious component also contains a two component room temperature vulcanisable silicone formulation.

24. Method of carrying out well construction, repair or abandonment operations which comprises using an addition-curing silicone formulation which comprises:

forming a plug in a well bore in one or more subterranean formations penetrated by the well bore which comprises placing an addition-curing silicone formulation on top of an existing non-gas tight plug and allowing the silicone formulation to set thereby producing a gas tight plug; and, which comprises carrying out the production of the gas-tight plug at a temperature in the range between 40 and 70° C.

* * * * *